United States Patent

Gunda

[11] Patent Number: 4,612,489
[45] Date of Patent: Sep. 16, 1986

[54] POWER TRANSMISSION

[75] Inventor: Rajamouli Gunda, Rochester, Mich.

[73] Assignee: Vickers, Incorporated, Troy, Mich.

[21] Appl. No.: 684,265

[22] Filed: Dec. 20, 1984

[51] Int. Cl.$^4$ .............................................. G05B 5/01
[52] U.S. Cl. .................................... 318/590; 318/611;
318/621; 318/561; 318/626
[58] Field of Search ............... 318/616, 621, 610, 590,
318/615, 611, 592, 593, 594, 603, 632, 561, 601,
604, 626

[56] References Cited

U.S. PATENT DOCUMENTS 2,954,514  9/1960  Hemstreet ..................... 318/621 X
3,721,882  3/1973  Helms ............................ 318/594 X Primary Examiner—William M. Shoop, Jr.
Assistant Examiner—Patrick C. Keane
Attorney, Agent, or Firm—Barnes, Kisselle, Raisch, Choate, Whittemore & Hulbert

[57] ABSTRACT

An electrohydraulic servo control system responsive to a load acceleration or velocity command input signal wherein the input command signal is integrated and compared with position feedback from the valve actuator and load to obtain an error signal which controls the actuator. The velocity command input may be multiplied by an exponential factor to compensate for system following error. Another modification contemplates resetting of command signals to compensate for following error and to eliminate dead time upon change of direction of the load by the operator.

2 Claims, 9 Drawing Figures

POWER TRANSMISSION

The present invention is directed to electrohydraulic valve control systems, and more particularly to systems for controlling valve output as a function of operator velocity and/or acceleration demand.

BACKGROUND AND OBJECTS OF THE INVENTION

Electrohydraulic valve control systems for vehicles and like applications often require not only position control of the system output, but also velocity and/or acceleration control as well. For example, an excavator may require position control of the bucket teeth during a digging cycle, velocity control during other modes of operation, and acceleration control during swing drive. It is conventional to provide separate position, velocity and acceleration sensors for closed loop feedback control during the position, velocity and acceleration demand modes, respectively. However, provision of three transducers adds to the overall cost and complexity of the system.

It is a general object of the present invention to provide an electrohydraulic valve control system wherein position, velocity and/or acceleration control may be obtained while employing only one feedback sensor. In this connection, it has been recognized that position feedback is more readily amenable to operator display and to automation. It is therefore a more specific object of the invention to provide an electrohydraulic valve control system which employs a position sensor and feedback loop and is adapted to function in the velocity and/or acceleration demand control modes.

Another object of the invention is to provide an electrohydraulic valve control system of the described character which functions in the velocity or acceleration control modes and which compensates for lag, creep or dead-time in the system output.

SUMMARY OF THE INVENTION

The present invention contemplates an electrohydraulic servo control system which includes an hydraulic valve actuator for variably positioning a load, such as the bucket of an excavator. A position sensing transducer is coupled to the actuator and load to provide an electrical signal indicative of actual position at the actuator and load. The actuator is controlled by an error signal as a function of the difference between an input position command signal and the transducer signal indicative of actual position.

In accordance with a first important aspect of the invention, the position-control servo system is adapted to operate in velocity of acceleration demand modes by receiving and suitably integrating the velocity or acceleration input command signal to provide a facsimile position command signal, and treating such facsimile position command signal as a position command input signal to the system for obtaining the actuator error control signal. (The term "motion command signal" in the following description and claims is employed in a generic sense to encompass command signals calling for a particular velocity or acceleration at the actuator and load, as distinguished from a position command signal calling for a particular position at the actuator and load.)

Implementation of velocity and acceleration control in electrohydraulic servo control systems typically results in a predetermined following error or lag at the actuator and load. The amount of this following error will, of course, vary as a function of the amplitude of the input motion command signal. In accordance with a second aspect of the invention, an offset signal is obtained as a function of the motion command signal and added to the facsimile position command servo system. Most preferably, this offsetting function is initiated exponentially to avoid sudden acceleration or jerk at the actuator and load.

A third important aspect of the invention is directed to eliminating creep and dead time in velocity or acceleration command systems when it is desired to change the direction of motion at the load. In accordance with this aspect of the invention, amplitude of the motion command input signal is sensed and the facsimile position command signal is set equal to the actuator position signal when the motion command signal is equal to zero.

BRIEF DESCRIPTION OF THE DRAWINGS

The invention, together with additional objects, features and advantages thereof, will be best understood from the following description, the appended claims and the accompanying drawings in which:

DETAILED DESCRIPTION

Figure 1:
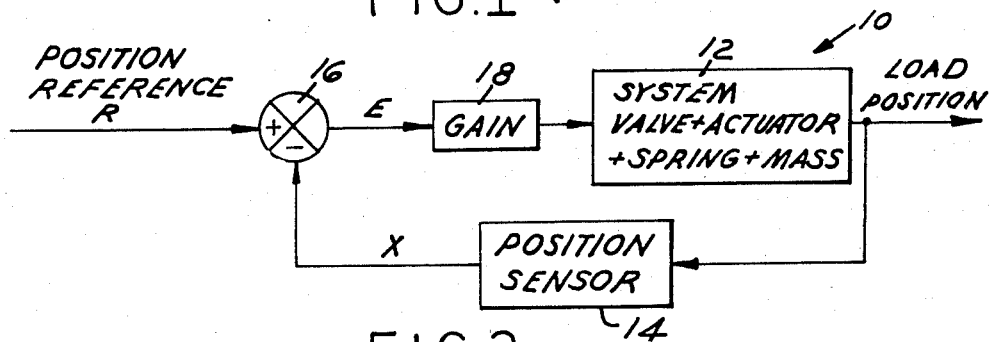
FIG. 1 is a functional block diagram of a position demand servo system in accordance with the prior art.

FIG. 1 illustrates a conventional position command electrohydraulic servo control system 10 as comprising a valve actuator system 12 which includes an electrohydraulic valve coupled by an actuator to a load. The actuator system, including the load, is characterized by an inertial mass and spring elasticity. A position transducer 14 is suitable mechanically coupled to the actuator and load to provide an electrical output signal X as a function of actual actuator and load position. A position command or reference signal R is fed to a summer 16 which provides an error signal E as a function of the difference between the command reference R and actual position X. The error signal E, fed through a suitable amplifier having gain 18, controls operation of actuator system 12. It will be appreciated that summer 16 and gain 18 would typically be combined in a single analog amplifier. System 12 and transducer 14 may be of any suitable types, and indeed may be contained in a single assembly. Position command reference R may be generated by any suitable means, such as an operator joystick.

Figure 2:
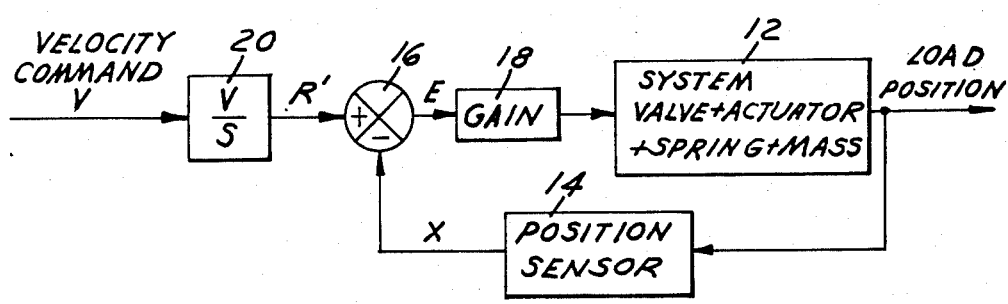
FIG. 2 is a functional block diagram of a velocity demand servo system in accordance with the present invention.

FIG. 2 illustrates a modification to FIG. 1 in accordance with the invention for implementing velocity demand control. A velocity command signal V, which may be generated by an operator joystick for example, is fed to an integrator 20, division of the signal V by the Laplace character "S" being a standard technique for illustrating an integration operation. The resulting signal is a facsimile position command signal R', and is fed to summer 16. The remainder of the circuit operates as a FIG. 1. Thus, a control system with position feedback is adapted to respond to velocity command input. Provision of integrator 20 is less expensive than replacing or supplementing the position transducer with a velocity transducer, and is more reliable (less noisy) than attempts to differentiate the output of the position transducer to provide velocity feedback.

Figure 3:
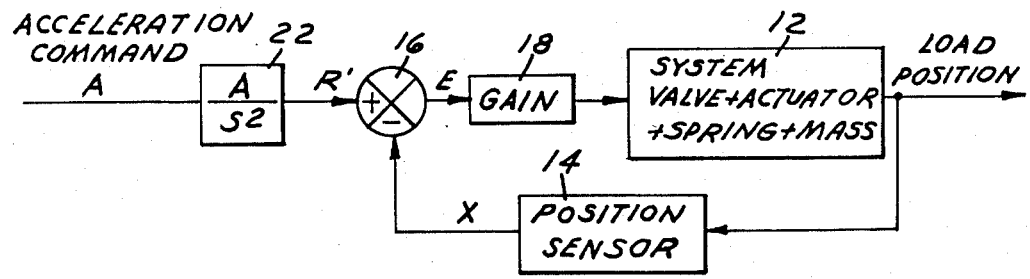
FIG. 3 is a functional block diagram of an acceleration demand system in accordance with the invention.

FIG. 3 illustrates a modification to FIG. 1 in accordance with the invention for implementing acceleration demand control. An acceleration demand signal A, from an operator joystick for example, is fed to a double integrator 22. The output of integrator 22, which provides a facsimile position command signal R', is fed to summer 16. It will be appreciated, of course, that one or both of the circuits of FIGS. 2 and 3 may be combined with that of FIG. 1, or with each other, to provide a system having multiple differing command inputs.

Figure 4:
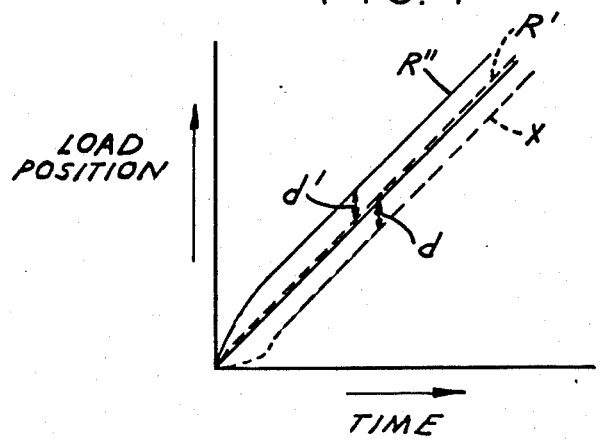
FIG. 4 is a graphic illustration useful in explaining operation of the embodiment of FIG. 5.
Figure 5:
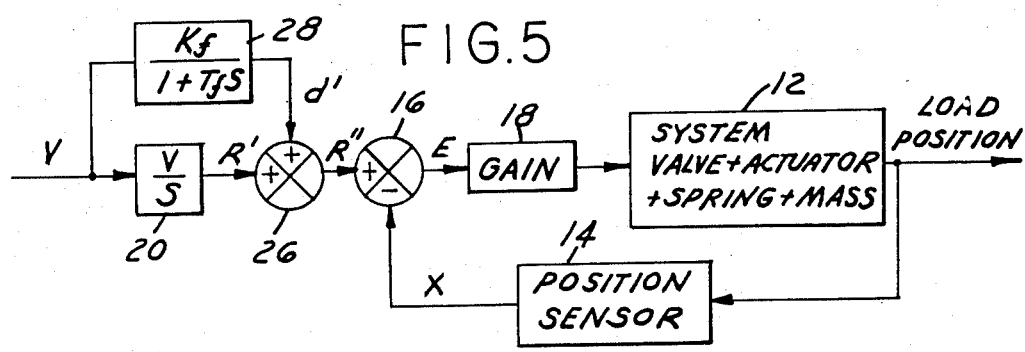
FIG. 5 is a functional block diagram of a modification to FIG. 2 for eliminating following error in accordance with a second aspect of the invention.

At any given time when the position command signal R' (FIG. 2 or 3) is increasing (or decreasing), actual position X will lag behind desired position R' by a factor d (FIG. 4). This factor, which is termed following error in the art, is a function of the mechanical characteristics of system 12, and also of the magnitude of the desired rate of change of the command signal R', i.e. a function of velocity V. FIG. 5 illustrates a modification to the embodiment of FIG. 2 for reducing or eliminating such following error. Referring to FIG. 5, the velocity command signal V is fed through integrator 20 to a first summer 26. The command signal V is also fed to a multiplier 28. The output of multiplier 28, which is an offset signal d' (FIGS. 4 and 5), is fed to a second input of summer 26 where signal d' is added to facsimile command signal R' to provide a corrected or composite facsimile position command signal R" to summer 16. Within multiplier 28, the velocity signal V is multiplied by the factor $K_f/(1+T_fS)$, wherein $K_f$ is a constant selected as a function of the following error, S is the Laplace character, and $T_f$ is a time constant selected to provide exponential initialization as shown in FIG. 4, and thus avoid system jerk. After the initialization time determined by the constant $T_f$, the offset d' displaces the system position input command signal R" such that actual position X tracks desired position R' as shown in FIG. 4.

It will be appreciated, of course, that the modification of FIG. 5 may also be implemented in FIG. 3 by dividing the double integration stage 22 into two single integration stages: $V'=A/S$ and $R'=V'/S$. The output V' of the first stage could then be fed to a multiplier 28, and the second stage V'/S used at 20 in FIG. 5.

Figure 6:
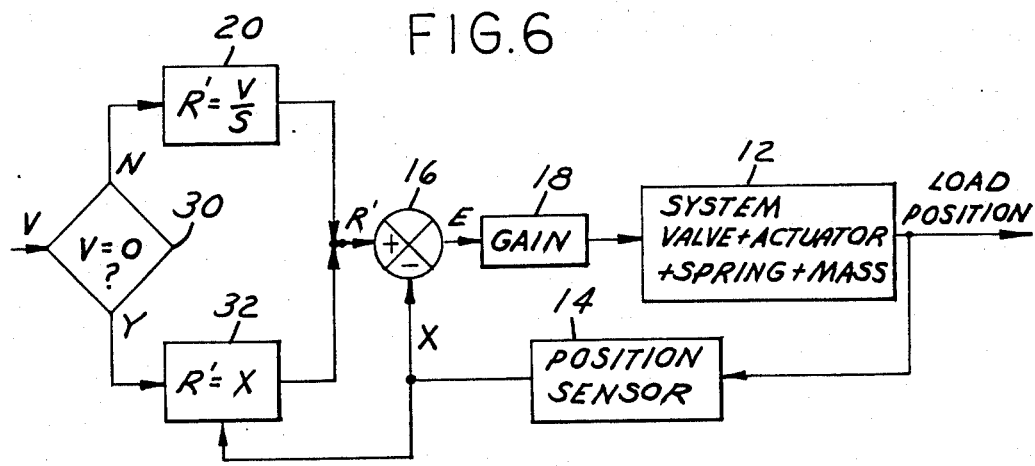
FIG. 6 is a functional block diagram of another modification to the embodiment of FIG. 2 for eliminating creep and dead time upon change of motion direction in accordance with a third aspect of the invention.

FIG. 6 illustrates a third important aspect of the invention. The input velocity command signal V is first tested at 30 for equality with zero. If the velocity command signal V is non-zero, the signal V is integrated at 20 to provide the facsimile position signal R', which is fed to summer 16 as in FIG. 2. However, if the velocity command is equal to zero, logic is routed to the stage 32, which receives an X input from sensor 14, and the facsimile position command R' is set equal to X.

Figure 7:
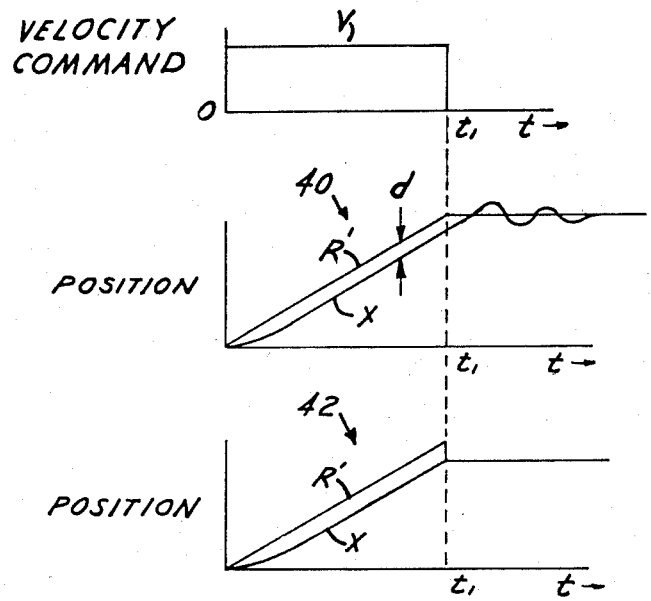
FIGS. 7 and 8 are graphic illustrations for explaining operation of the embodiment of FIG. 6.

FIG. 7 illustrates operation of the embodiment of FIG. 6 for eliminating end position creep due to following error. Velocity command V from an operator joystick or the like is uniform, and position signals R' and X increase uniformly as shown at 40. At time $t_1$, the actual load position X is observed by the operator to be at the desired location, and velocity command signal V is reduced to zero. Facsimile position command signal R' is accordingly horizontal and uniform. However, due to the following error d previously discussed, actual load position X is lagging facsimile position command R', so that the actual load continues to move under control of the error signal E (equal to R'-X). In accordance with the invention of FIG. 6, however, operation of which is illustrated in the lower graph 42 of FIG. 7, the facsimile position command signal R' is set equal to the actual position signal X at time t1 when V equals zero. Thus, the actuator and load remain at the position desired by the operator.

Figure 8:
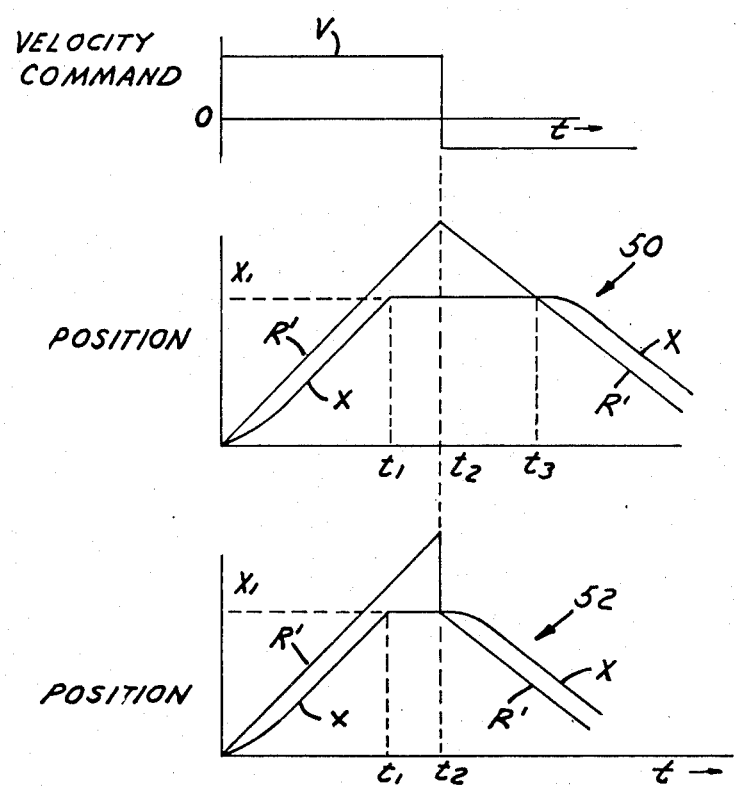

FIG. 8 illustrates operation of the system of FIG. 6 where the load reaches its limit position $x_1$ at time $t_1$, which limit may be set by physical system constraints, for example. The operator, however, continues to demand constant velocity until time $t_2$, and then reverses direction. In the illustration at 50, the facsimile position command R' continues to increase between times $t_1$ and $t_2$ even though the load cannot follow. The position demand reverses slope after time $t_2$, but does not intersect the limit position signal $x_1$ until time $t_3$. Thus, there is no load movement during the dead time $t_2$-$t_3$. After time $t_3$, load position X follows (but lags behind) facsimile position command R'.

Operation of the invention of FIG. 6 is illustrated in the lower graph 52 in FIG. 8 at time $t_2$, when the velocity signal V passes through zero, the facsimile position command signal R' is set equal to X. Thereafter, the facsimile position signal R' decreases from limit $x_1$, and load position can follow. There is no dead time $t_2$-$t_3$ as in illustration 60. It will be appreciated, of course, that the modification of FIG. 6 can be combined with that of FIG. 5 and/or FIG. 3 previously described.

Figure 9:
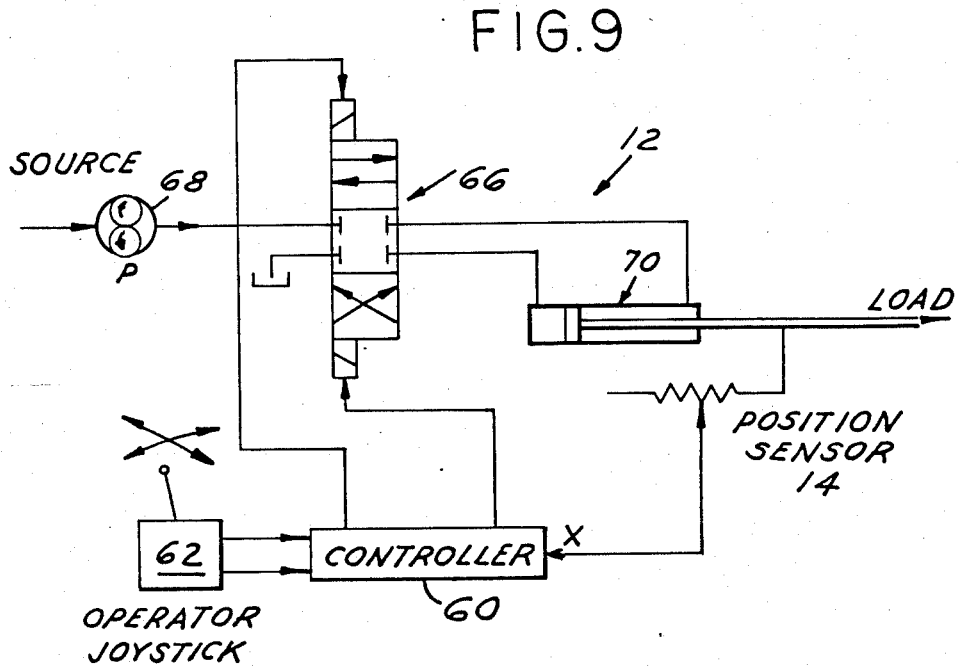
FIG. 9 is a schematic diagram of an exemplary electrohydraulic control system for implementing the invention.

It is presently preferred to implement all of the stages 20, 22, 28, 30 and 32 in a suitably programmed digital computer/controller 60, as shown in FIG. 9, which receives and periodically samples inputs from the operator joystick 62 and from the load position sensor 14. Controller 60 provides outputs to the solenoids of a valve 66, for example, which selectively feeds hydraulic fluid under pressure from a source and pump 68 to a drive cylinder 70. The piston of cylinder 70 is coupled to the load. Analog circuitry could also be employed in controller 60, as will be apparent to the artisan.

The general subject matter of the overall disclosure, as well as the specific embodiments of FIGS. 1-5, are the subject of concurrently filed application Ser. No. 684,266 assigned to the assignee hereof. This application is directed specifically to the embodiment of FIG. 6.

The invention claimed is:
1. An electrohydraulic servo system comprising a valve actuator adapted to variably position a load, position sensing means coupled to said actuator and load to provide an electrical signal indicative of actual position at said actuator and load, means for receiving a motion command signal, motion command integration means responsive to said motion command signal to provide a position command signal, means for providing an error signal to control said valve actuator as a function of a difference between said actual position signal and said position command signal, and means responsive to said motion command signal independently of said integration means for automatically setting said position command signal equal to said actual position signal when said motion command signal is equal to zero.

2. In an electrohydraulic servo control system which includes a valve adapted to variable position a load, position sensing means coupled to said actuator and load to provide an electrical signal indicative of actual position at the actuator and load, and means for providing an electrical error signal to control said actuator as a function of a difference between said actual position signal and a position command input signal, the improvement for controlling said system as a function of a motion input command and for eliminating creep and dead time associated with a change in motion as said actuator and load, said improvement comprising means for receiving a motion command input signal, integration means responsive to said motion command input signal to provide a first position command signal, means independent of said integration means and responsive to said motion command signal and to said actual position signal to provide a second position command signal equal to said actual position signal, and means operable in a first mode of operation when said motion command signal is unequal to zero to provide said first position command signal as said position command input signal to said means for providing said error signal, and operable in a second mode of operation when said motion command signal is equal to zero to provide said second position command signal as said position command input signal to said means for providing said error signal.

* * * * *